(12) United States Patent
Zhang

(10) Patent No.: US 7,380,721 B2
(45) Date of Patent: Jun. 3, 2008

(54) LOW-COST COMPACT BAR CODE SENSOR

(75) Inventor: Wenwei Zhang, Bellshill (GB)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/508,606

(22) Filed: Aug. 22, 2006

(65) Prior Publication Data

US 2008/0048037 A1 Feb. 28, 2008

(51) Int. Cl.
 *G06K 7/10* (2006.01)
(52) U.S. Cl. ............... 235/462.43; 235/462.01; 235/462.02; 235/462.03; 235/462.04; 235/462.05; 235/462.06; 235/462.07; 235/462.08; 235/462.09; 235/462.1; 235/462.11; 235/462.12; 235/462.13; 235/462.14; 235/462.15; 235/462.16; 235/462.17; 235/462.18; 235/462.19; 235/462.2; 235/462.21; 235/462.22; 235/462.23; 235/462.24; 235/462.25; 235/462.26; 235/462.27; 235/462.28; 235/462.29; 235/462.3; 235/462.31; 235/462.32; 235/462.33; 235/462.34; 235/462.35; 235/462.36; 235/462.37; 235/462.38; 235/462.39; 235/462.4; 235/462.41; 235/462.42; 235/462.44; 235/462.45; 235/462.46; 235/462.47; 235/462.48; 235/462.49
(58) Field of Classification Search ............... 235/462.01–462.49
See application file for complete search history.

(56) References Cited

U.S. PATENT DOCUMENTS

| | | | | |
|---|---|---|---|---|
| 4,079,511 A | * | 3/1978 | Grabbe | 29/827 |
| 4,160,308 A | * | 7/1979 | Courtney et al. | 438/25 |
| 4,722,060 A | * | 1/1988 | Quinn et al. | 716/19 |
| 5,587,883 A | * | 12/1996 | Olson et al. | 361/723 |
| 5,974,066 A | * | 10/1999 | Wu et al. | 372/50.124 |
| 6,062,476 A | * | 5/2000 | Stern et al. | 235/462.35 |
| 6,119,939 A | * | 9/2000 | Schwartz et al. | 235/462.01 |
| 6,257,491 B1 | * | 7/2001 | Tan et al. | 235/462.36 |
| 6,614,100 B1 | * | 9/2003 | Hauser et al. | 257/666 |
| 6,685,092 B2 | * | 2/2004 | Patel et al. | 235/454 |
| 6,712,273 B1 | * | 3/2004 | Stapleton et al. | 235/462.49 |
| 6,747,344 B2 | * | 6/2004 | Corisis et al. | 257/668 |
| 6,811,085 B2 | * | 11/2004 | Carlson et al. | 235/454 |
| 6,970,245 B2 | * | 11/2005 | Fritz et al. | 356/400 |
| 7,063,259 B2 | * | 6/2006 | Oliva | 235/454 |
| 7,190,706 B2 | * | 3/2007 | McColloch | 372/34 |
| 2003/0189099 A1 | * | 10/2003 | Carlson et al. | 235/454 |
| 2005/0205677 A1 | * | 9/2005 | Patel et al. | 235/454 |
| 2006/0237540 A1 | * | 10/2006 | Saxena et al. | 235/454 |

* cited by examiner

*Primary Examiner*—Steven S Paik
*Assistant Examiner*—Christle I Marshall
(74) *Attorney, Agent, or Firm*—Matthew F. Lambrinos; Luis M. Ortiz; Kermit D. Lopez

(57) ABSTRACT

A barcode sensor package has an optical emitter circuit and an optical detector circuit which are formed as one or more integrated optical circuits disposed in a housing which has a reading surface and one or more apertures located between the optical emitter and detector circuits. The optical emitter circuit has an emitter die, such as a vertical cavity surface emitting laser (VCSEL), for emitting a light beam and a diffraction optical element disposed on the emitter die for focusing the light beam to a bar code. The optical detector circuit has a photodetector die, such as a phototransistor, for detecting reflective light and another diffraction optical element disposed on the photodetector die for guiding light reflected from the bar code to the detector. The diffraction optical elements are fabricated by patterning optical layers, deposited on respective emitter and detector dies, using photolithograph or a direct write process.

8 Claims, 10 Drawing Sheets

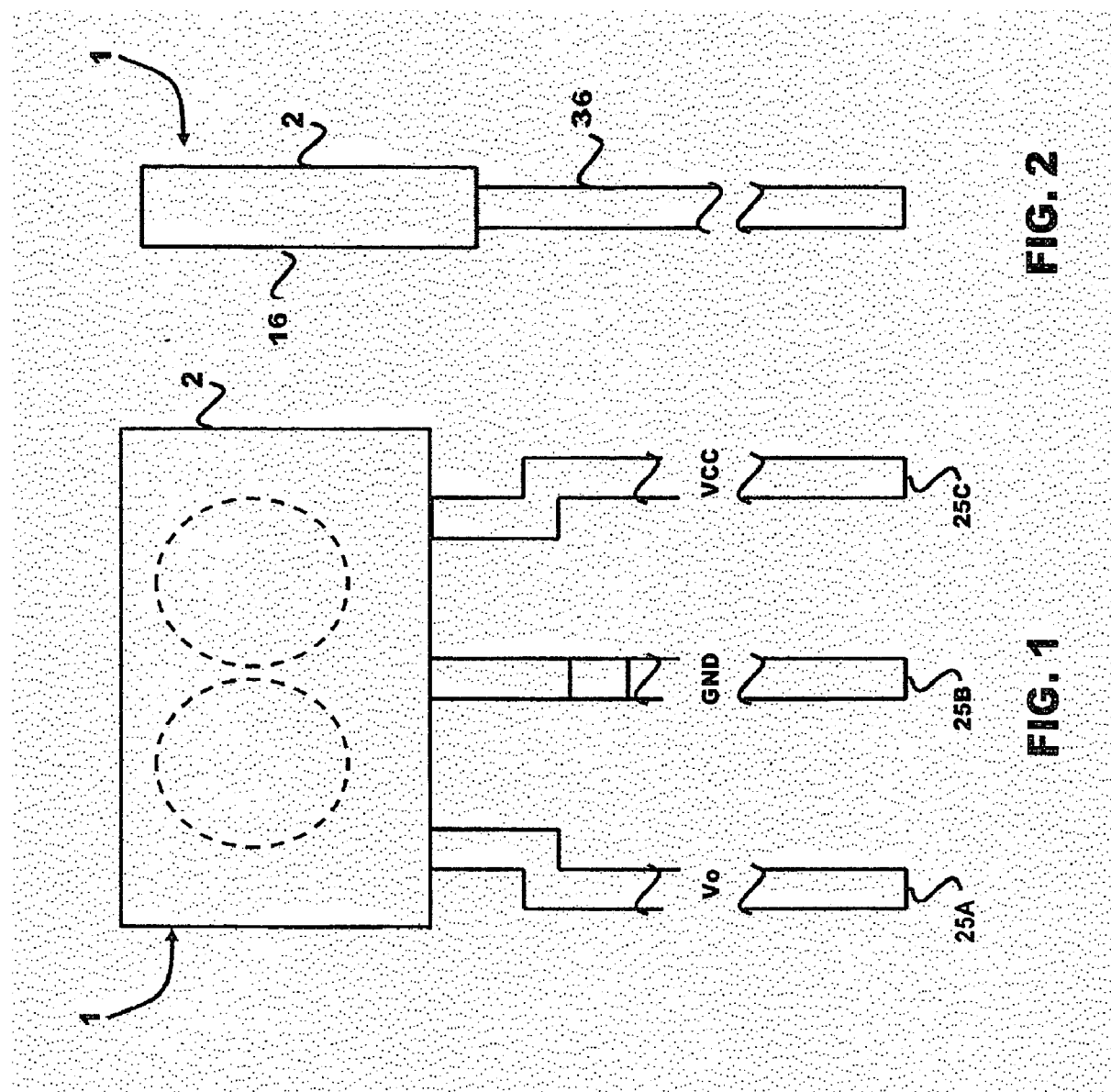

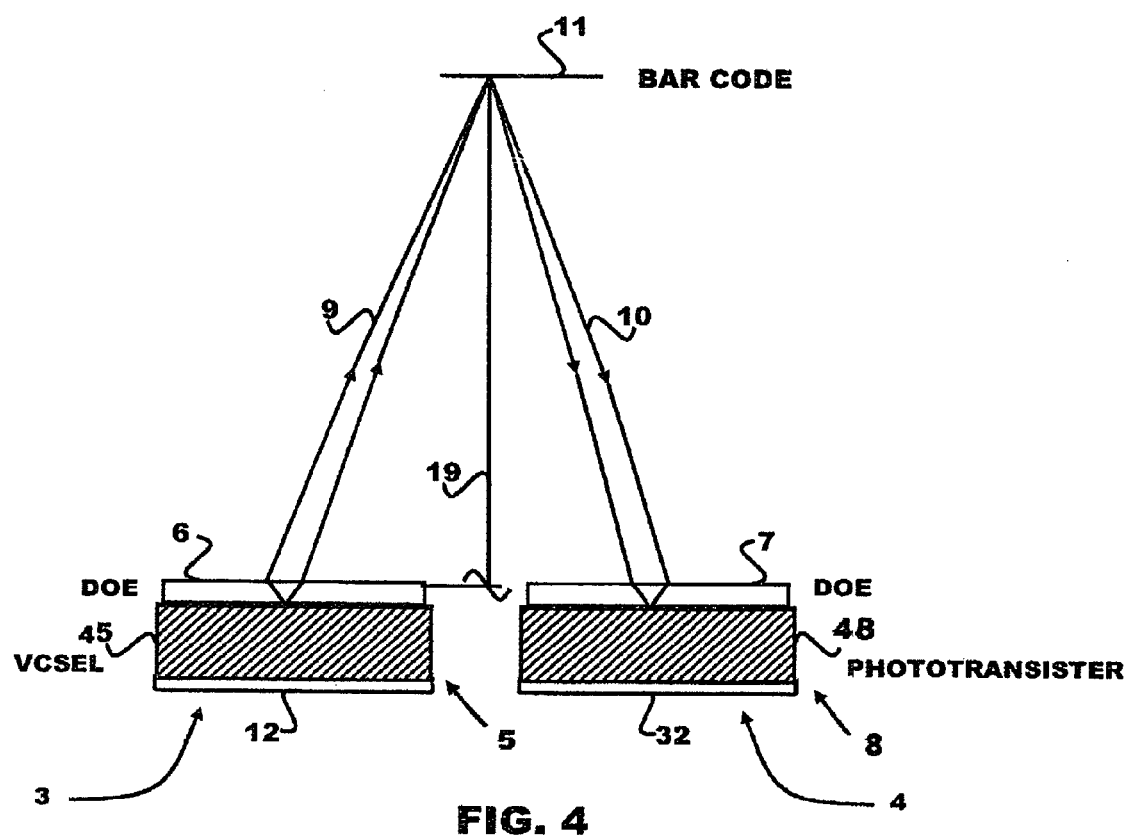

LOW-COST COMPACT BAR CODE SENSOR

TECHNICAL FIELD

Embodiments are generally related to sensors and, in particular, to bar code sensors and methods of forming such sensors. Embodiments are additionally related to packaging bar code sensors. Also, embodiments are related to MEMS bar code sensors.

BACKGROUND OF THE INVENTION

Known barcode sensor systems generally use lasers in conjunction with conventional lenses or other optics for focusing or concentrating sufficient laser radiation on the bar code to be scanned. The systems additionally include detectors also in conjunction with conventional optics for receiving light reflected from a target area of the bar code and providing an output signal representing the bar code. Other barcode sensor systems utilize light emitting diodes (LEDs) as the light sources instead of lasers.

A known bar code sensor of the prior art, for example the bar code sensor 300 shown in FIGS. 9A & 9B of the accompanying drawings, includes a light source and photodiode dies molded into components (not shown), a PCB 301 onto which the light source and photodiode components (not shown) are populated, processing circuitry 302 for processing the sensor signal also populated on the PCB, a housing holding lenses and into which is inserted and glued the PCB with light source and photodiode components thereon, and a housing cover 304 assembled to the housing to enclose the components and lenses within the housing.

The aforementioned known barcode systems are generally of large dimensions owing to the large space requirements of bulky lenses or other optics necessary for concentrating sufficient illumination both on the bar code to be scanned and the detector after reflection from the bar code target area. The optics of such systems are complicated to align and assemble and suffer from optical inefficiencies which result in short working distances and higher than necessary power consumption requirements to compensate for these optical inefficiencies. High manufacturing costs and inefficient and unreliable operation of these bar code sensor systems limit their applications in many fields.

The aforementioned problems demonstrate that there is a need to provide a low cost, compact bar code sensor which is capable of operating in an efficient manner.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect to provide for an improved bar code sensor.

It is another aspect, to provide for a low cost and compact bar code sensor.

It is another aspect to provide for a method of manufacturing an improved bar code sensor The aforementioned aspects of the invention and other objectives and advantages can now be achieved as described herein. According to one aspect, a bar code sensor package includes an optical emitter circuit and an optical detector circuit. The optical emitter circuit has an emitter for emitting a light beam and a diffraction optical element for focusing the light beam. The optical detector circuit has a photodetector for detecting reflective light and another diffraction optical element for guiding the reflective light to the detector. The optical emitter and detector circuits can have more than one emitter and detector, respectively. The bar code sensor package also has a housing having a reading surface and one or more apertures located between the reading surface and both the emitter and photodetector. The optical emitter circuit and optical detector circuit comprise integrated optical circuit disposed in the housing.

Advantageously, by utilizing diffracting optical elements as the optical lenses for the emitter and detector, the optical lenses can be made more compact and can be aligned more simply and more accurately with the emitter and detector than optical lenses of prior art bar sensors. Furthermore, the diffraction optical elements can be mounted in the first level packaging without the need for second level packaging by disposing the diffraction optical elements on the respective emitter and detector.

The diffraction optical elements can be integrated into the wafer level using lithography enabling much better manufacturing accuracy and alignment accuracy. Thus, potential larger working distance and finer focus point can be reached and resolution of the sensor can be improved. Manufacturing the diffraction optical elements into the wafer level prior to sawing of the wafer, enables compact light source and photodetectors with well-aligned lens to be provided cheaply compared with prior art bar code sensors which employ light source and photodetectors with external aligned lens.

The emitter can comprise a light emitting diode which is preferably a vertical cavity surface emitting laser (VCSEL). The detector can comprise a photodetector such as a phototransistor. The diffraction optical elements can be fabricated by photolithography.

The bar code sensor can also include a lead frame integrated in the housing for electrically connecting the optical emitter and detector circuits to external circuitry. The optical emitter circuit and optical detector circuit can be retained in alignment on the lead frame The housing can be a mold or encapsulating material surrounding the integrated circuit(s).

According to another aspect, a bar code sensor package has an optical emitter circuit and an optical detector circuit. The optical emitter circuit has an emitter die for emitting a light beam and a diffraction optical element disposed on the emitter die for focusing the light beam. The optical detector circuit has a photodetector die for detecting reflective light and another diffraction optical element disposed on the photodetector die for guiding the reflective light to the detector. The bar code sensor package also includes a housing having a reading surface and one or more apertures located between the reading surface and the emitter and photodetector dies. The optical emitter circuit and the optical detector circuit comprise one or more integrated optical circuits disposed in the housing.

The emitter die comprises a vertical cavity surface emitting laser (VCSEL). A lead frame can be integrated in the housing for electrically connecting the optical emitter and detector circuits to external circuitry.

The housing can be a plastic mold or encapsulating material surrounding the integrated circuit(s).

The optical emitter circuit and the optical detector circuit can be formed as spaced apart individual integrated circuits retained on respective lead frame pins for providing power and a signal output path to the emitter and detector, respectively.

Wire bonding can be utilized to interconnect the optical emitter circuit and optical detector circuits in the housing. Wire bonding can also be utilized to interconnect a separate ground pin of the leadframe to the optical emitter circuit and/or the optical detector circuit.

The leadframe can be configured as a surface mount lead frame.

The one or more integrated optical circuits can further include signal conditioning circuitry electrically connected to the optical detector circuit.

According to another embodiment, a method of forming a bar code sensor, the method comprises integrating on a substrate an emitter for emitting a light beam and an optical element for focusing the light beam to thereby form an integrated optical emitter circuit, integrating on the substrate, or another substrate, a detector for detecting reflective light and another optical element for guiding the reflective light on the detector to thereby form an integrated optical detector circuit, providing a housing having a reading surface and at least one apertures formed therein between the reading surface and the emitter and detector, and disposing the integrated optical circuit(s) in the housing.

The step of integrating the emitter and optical element on the substrate can comprise disposing a light emitting diode and a diffraction optical element on the substrate.

The light emitting diode can comprise a vertical surface cavity emitting laser (VCSEL).

The step of integrating the detector and optical element on the substrate or the another substrate comprises disposing a photodetector and another diffraction optical element on the substrate or the substrate.

The steps of integrating the optical elements and the detector/emitter on the substrate(s) can further comprise providing optical layers on the emitter and detector respectively and patterning the optical layers to form the diffraction optical elements. The step of patterning the optical layers can comprises forming patterns in the optical layers using a direct-write or photolithography process.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 1 & 2 illustrate side views of a bar code sensor according to a preferred embodiment;

FIG. 4 illustrates a schematic diagram of the optical structure of the bar code sensor of FIG. 1 arranged to read a bar code;

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 3:
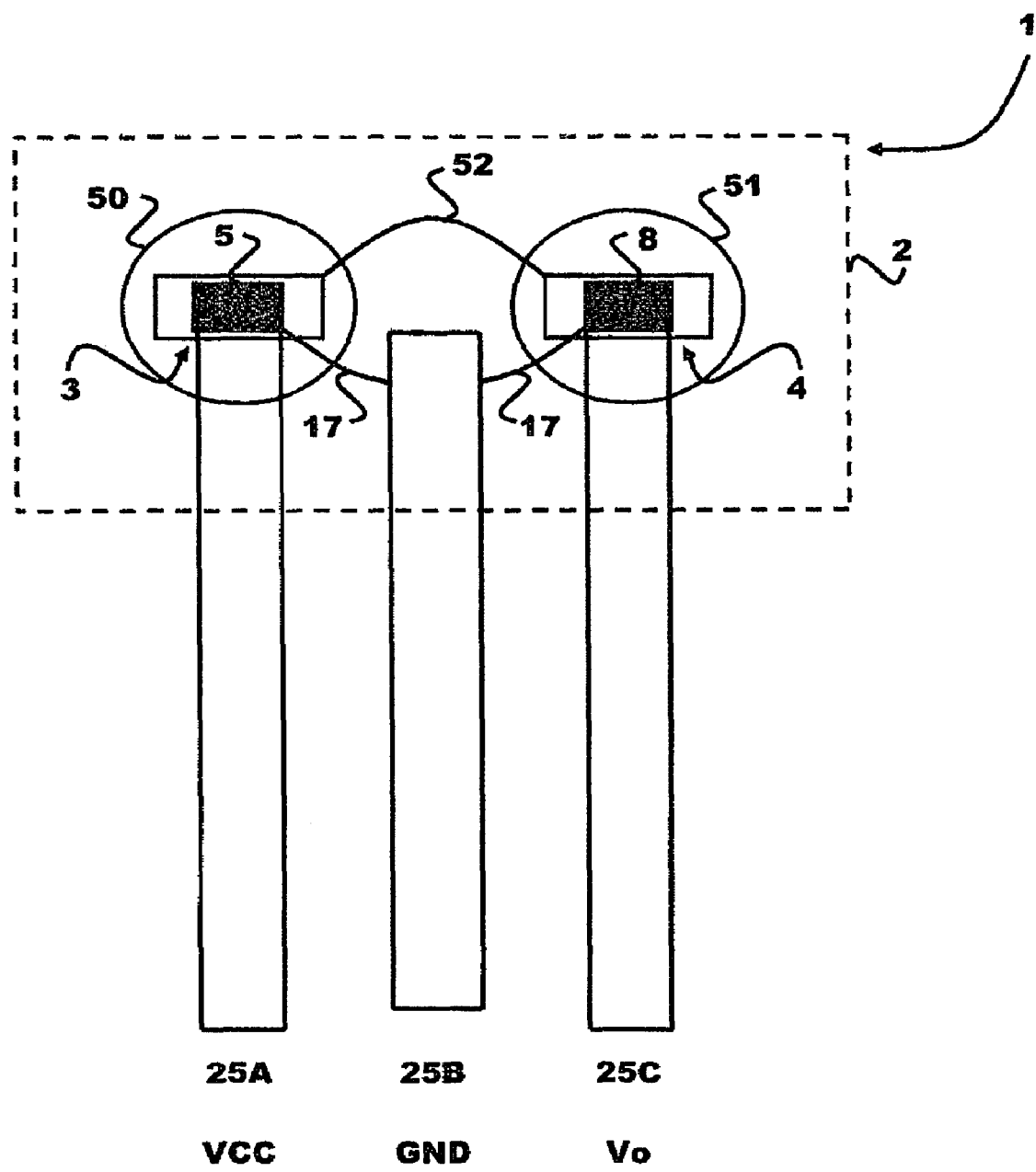
FIG. 3 is the same side view as FIG. 1 but illustrating the components inside the sensor housing.

Referring to FIGS. 1 & 2 of the accompanying drawings, which illustrate side views of a bar code sensor according to one embodiment, and additionally FIG. 3, which illustrates the same side view as FIG. 1 but showing the components inside the housing, the bar code sensor 1 has a housing 2 defining apertures 50, 51 and a cavity in which are disposed an optical emitter circuit 3 and an optical detector circuit 4 thereby forming a sensor package. A lead frame 5 is integrated in the housing 2 for electrically connecting the optical emitter and detector circuits 3, 4 to an external printed circuit board or other external circuitry.

As best shown in FIG. 4, which illustrates a schematic diagram of the optical structure of the bar code sensor of FIG. 1 arranged to read a bar code, optical emitter circuit 3 having an emitter 5 for emitting a light beam 9 and an optical element 6 for concentrating and focusing the light beam on a bar code 11. Optical detector circuit 4 has a photodetector 8 for detecting light 10 reflected from the bar code 11 and an optical element 7 for concentrating the reflected light to the photodetector. In the illustrative embodiment of the bar code sensor of FIG. 1, the emitter 5 is in the form of an emitter die 5 which is preferably a light emitting diode configured as a vertical surface emitting laser (VSCEL) fabricated on the die substrate 12, and the detector 8 is a photo detector die which is preferably a phototransistor fabricated on another die substrate 32. Die substrates 12, 32 are silicon substrates but alternative substrates can be adopted. Also, the emitter 5 and detector 8 can alternatively be other types of light sources and photodetectors, respectively, which are capable of being fabricated on an integrated circuit substrate. Furthermore, optical emitter and detector circuits 3, 4 could be formed spaced apart on the same substrate instead of separate substrates 12, 32, if necessary.

Optical elements 6, 7 are configured as diffraction optical elements which can be composed on the emitter die 5 and detector die 8 to form the integrated optical emitter and detector circuits 3, 4, respectively. DOE lenses 6, 7 have two functions. The first is an optical function of focusing and bending emitted light 9 and reflective light 10 on the bar code target 11 and photodetector die 8, respectively. The second is to protect the emitter dies 5, 8 and detector from the environment, which is important for long lifetime of bar code sensors. As best shown in FIG. 4, the VCSEL light is bent and focused to the required target position of the bar code 11 by the diffraction optical element 6. The bent angle, which can be controlled by the DOE design, is calculated based on the required working distance 19 and the distance between the VCSEL 5 and phototransistor 8 as is known in the art. The light 10 reflected from the target surface is bent and focused on the phototransistor by the other DOE 7.

Advantageously, by disposing diffracting optical elements 6, 7 directly on the emitter 5 and detector 8, respectively, the optical elements can be made more compact and can be aligned more simply and more accurately with the emitter and detector than optical lenses of prior art bar sensors.

Furthermore, the diffraction optical elements 6, 7 can be mounted in the first level packaging without the need for second level packaging.

Referring now in more detail to the bar code sensor, housing 2 of FIGS. 1-3, which in the illustrative embodiment is a molded flat plastic package, a reading surface 16 is located on one side of the housing for placing in close proximity with the bar code 11 to be scanned and apertures 50, 51 are located between the reading surface 16 and respective emitter 5 and detector 8. The dimensions of the sensor housing are typically 3.4 (W)mm×2.2 (H)mm×1.1 (H)mm although the housing can have other dimensions if need be. Integrated optical circuits 3, 4 are disposed in the housing 2 spaced apart such that the focused emitted beam 9 can exit the housing through the associated housing aperture 50 and the reflected beam 10 can enter the housing, via the associated housing aperture 51, and be concentrated by the diffraction optical element 7. The apertures, which can be, for example, throughholes formed in the housing and extending longitudinally between the reading surface and the respective emitter 3 and detector 4, are configured to ensure that sufficient light can reach the bar code scanner and that the light intensity and field of reflective light reaching the detector 8 is appropriately restricted. Apertures 50, 51 are open in front of the emitter and detector circuits 3, 4 and have a diameter of typically 1.6 mm although other aperture dimensions can be adopted. Alternatively, the housing could have a single aperture, such as a slot, which is suitable dimensioned to function as both apertures.

The lead frame 5 has three longitudinally extending pins 25A, 25B, and 25C for carrying power, common ground and signal output which are embedded in the housing 2 and protrude from the housing bottom. The power supply pin 25A is directly connected to the emitter die 5, the output pin 25B is directly connected to the photodetector die 8 and the ground pin 25C is located in the housing between and spaced from the optical circuits 3, 4 and connected to both emitter and photodetector dies via conductive interconnects 17, such as for example metal wires or links embedded in the housing 2. In addition to providing electrical connections to the emitter and photodetector dies, the leadframe pins serve to retain the emitter and photodetector dies in alignment. In the illustrative embodiment, the power supply of detector die 8 can be connected on a power supply pad of the emitter die by means of wire bonding 52. If necessary, integrated optical detector circuit 4 can include signal conditioning circuitry, such as an operational amplifier, for conditioning the output signal of the phototransistor 8.

Figure 9A:
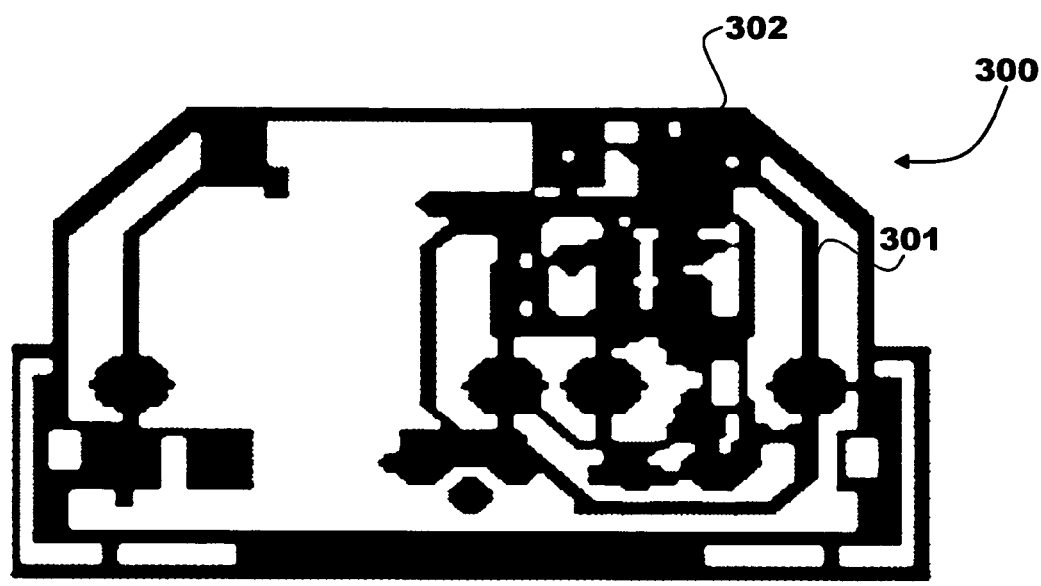
FIGS. 9(A) & 9(B), respectively, illustrate side and rear views a bar code sensor of the prior art.
Figure 9B:
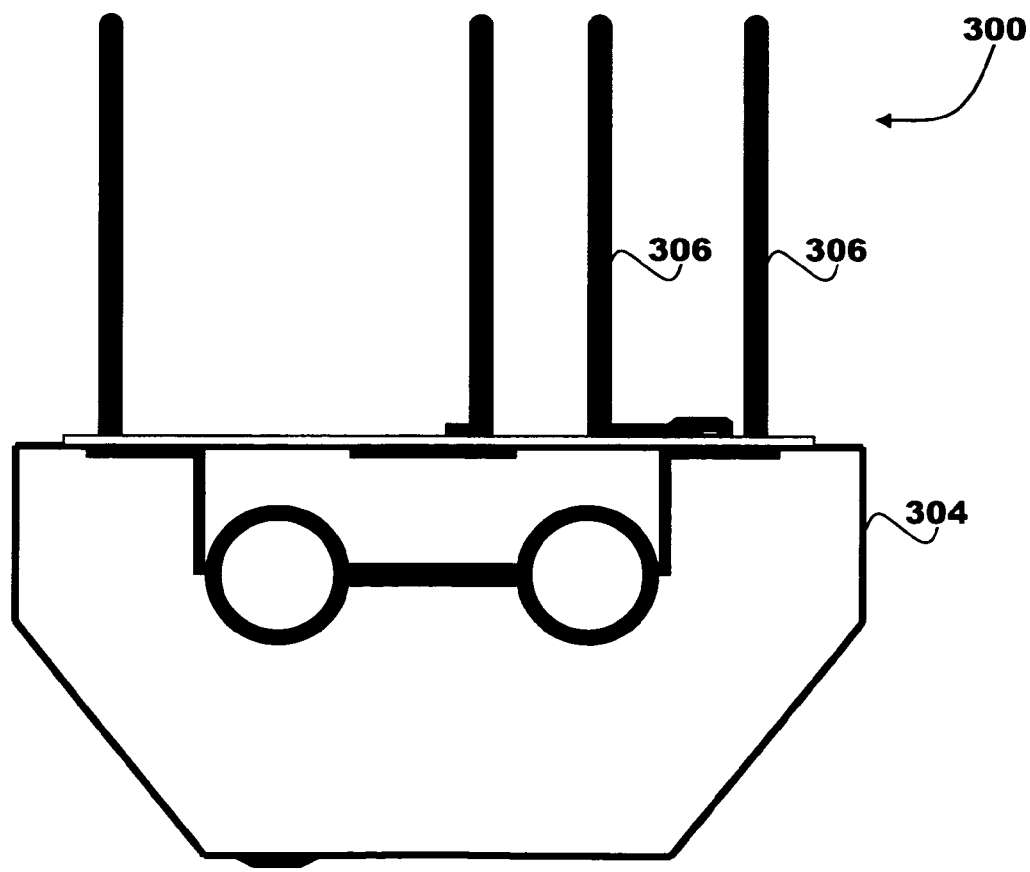

In prior art bar code sensors, such as the bar code sensor 300 shown in FIGS. 9A & B, 4 output pins 306 shown (one for spare) are soldered to a PCB 301. Emitter and detector with other electronic components for signal conditioning are soldered on the PCB using relevant printing tracing interconnects requiring extensive assembly and alignment work to be done during production. Advantageously, the barcode sensor 1 can be molded in component level without further alignment. Aperture 50,51 are formed without any molding compound, and the dies of light source and photodetector are seated in the die cups of the lead frame with wire bonding of the cathodes of the light source and photodiode on the common ground leg. Advantageously, the lead frame retains the dies in alignment, and accurate DOE lenses cover the die areas, which protect the dies from potential environmental corrosions.

Also, advantageously, arranging the pins 25A-25C to directly connect to the integrated optical circuits 3, 4, enables the pins to be incorporated into the first level packaging unlike in the bar code sensors of the prior art in which second level packaging is necessary to accommodate the pin connections.

As the diffraction optical elements 6, 7 together with the pins 25A-25C can be manufactured in the first level package, the bar code sensor can be built with highly automatic first level package machinery without the second level packaging required in prior art bar code sensors.

Advantageously, fabrication of the integrated optical circuits 3, 4 can be implemented by means of semiconductor and integrated circuit fabrication techniques. Preferably, the integrated optical circuits 3, 4 are mass produced by means of wafer level processing techniques in which respective diffraction optical elements 6, 7 are respectively composed on the emitter 5 and phototransistor 8 during the wafer processing stage before the opto's wafer is singulated, that is, separated from adjacent circuits using known wafer dicing methods, into the optical circuits 3, 4 and packaged in the first level. Optos cost are significantly reduced and the alignment process is simplified because the wafer level process has much compact and accurate optics.

A method of forming a bar code sensor will now be described according to one embodiment in which the bar code sensor formed by the method is the bar code sensor shown in the illustrative embodiment of FIG. 1. As a brief overview of the method, an emitter for emitting a light beam and an optical element for focusing the light beam are integrated on a substrate thereby to form an integrated optical emitter circuit. A detector for detecting reflective light and another optical element for guiding the reflective light on the detector are integrated another substrate to thereby form an integrated optical detector circuit. A housing is provided having a reading surface and at least one aperture formed between the reading surface and both the emitter and detector. The integrated optical circuit(s) are then disposed in the housing.

Figure 5A:
FIGS. 5A-G illustrate schematic diagrams of the integrated optical circuits of the bar code sensor of FIG. 1 at various stages of manufacture.
Figure 5B:
Figure 5C:
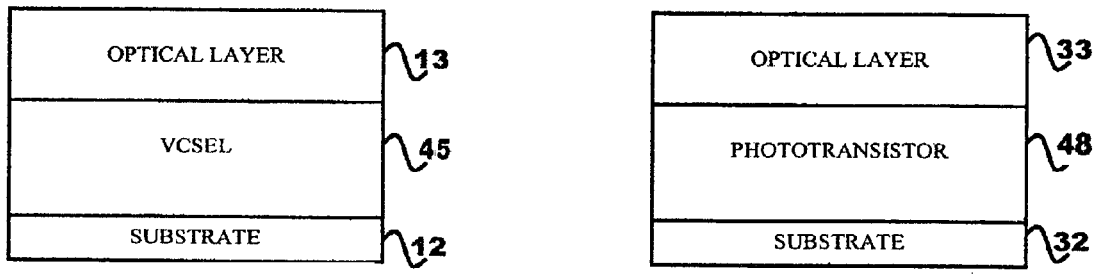
Figure 5D:
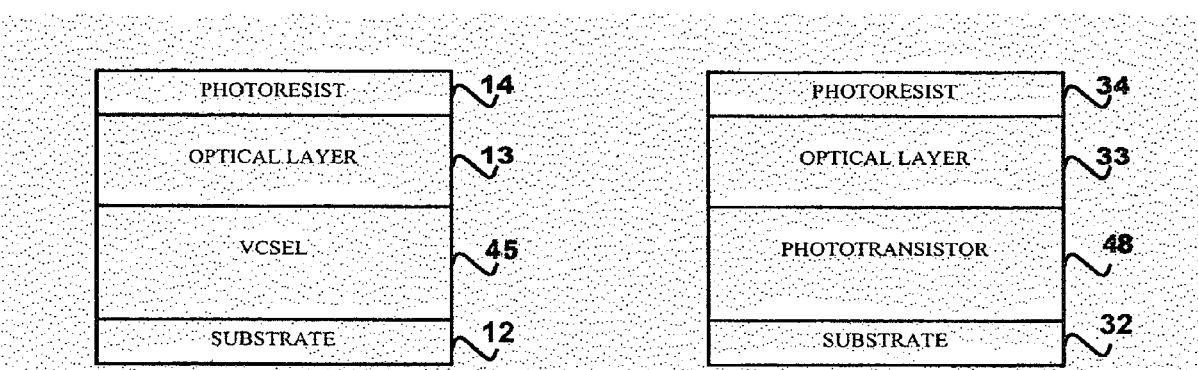
Figure 5E:
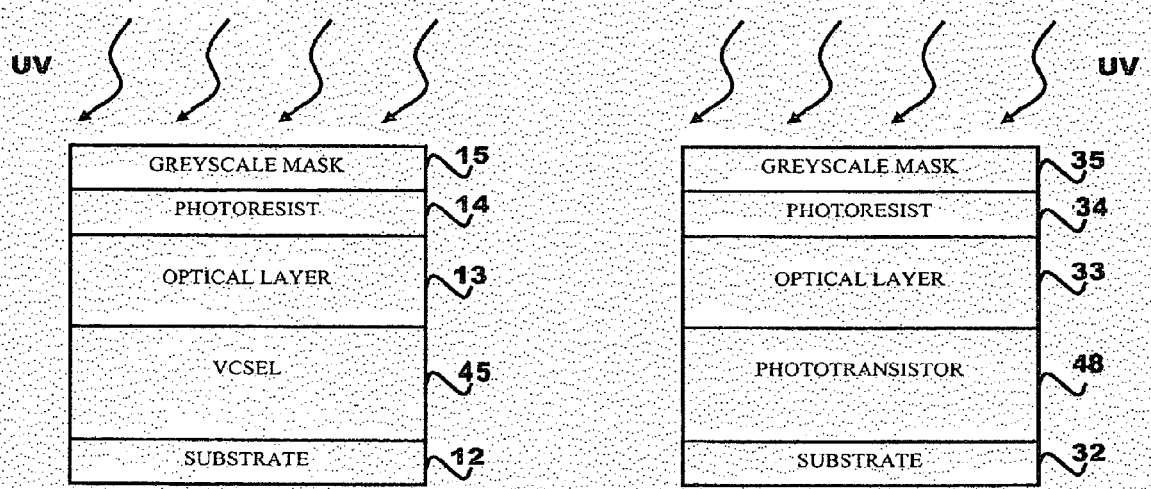
Figure 5F:
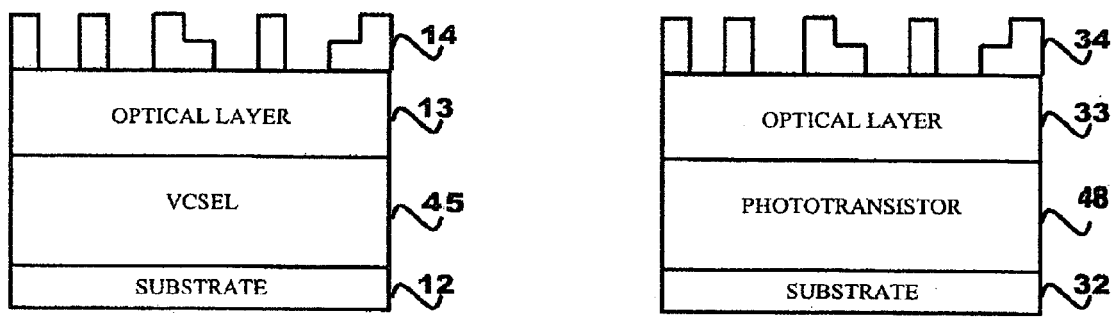
Figure 5G:
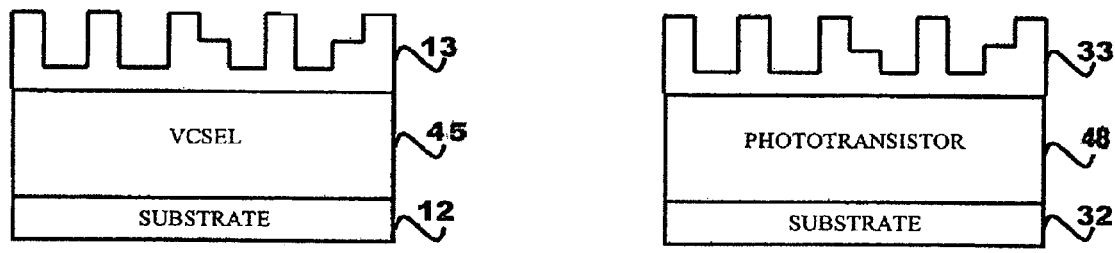

Referring to FIGS. 5A-G, which illustrate schematic diagrams of the integrated optical circuits of the bar code sensor of FIG. 1 at various stages of manufacture, the method of forming the integrated optical emitter circuit and integrated optical detector circuit will now be described in more detail. Initially, silicon substrates 12, 32 are provided (see FIG. 5A) Thereafter, the emitter 5 and detector 8, which in this embodiment are a VSCEL 5 and phototransistor 8, respectively, are fabricated by known semiconductor deposition techniques on the upper surface of the respective substrates 12,32, as indicated in FIG. 5B. Thereafter, optical layers 13, 33 are respectively deposited on the VSCEL 5 and phototransistor 8 (see FIG. 5C). The optical layers may be formed of glass like BK7, polymers like Polycarbonate and photoresistance like Su-8. The optical layers 13, 33 are then patterned to form respective diffraction optical elements on the VSCEL 5 and phototransistor 8. In this illustrative embodiment, the optical layers are patterned using photolithography techniques known in the art in which UV light sensitive photoresists 14,34 and grayscale masks 15,35 are sequentially applied to the upper surfaces of the optical layers 13,33 (FIGS. 5D & 5E. The photo resists are subsequently exposed to UV light through the masks as indicated in FIG. 5E. Portions of the optical layers 13, 33 which are exposed after UV modification of the photoresist layer are then etched to pattern the optical layer and thereby form the DOEs as shown in FIGS. 5F & 5G. Positive or negative photoresist can be used in conjunction with chemical agents to develop portions of the photoresist, which is exposed by UV light. Then the developed portions will be washed out for positive photoresistance as shown in FIGS. 5F or left in for negative photoresistance to obtain the optical layer pattern.

Advantageously the optical lenses are integrated into the wafer level using lithography enabling much better manufacturing accuracy and alignment accuracy. Thus, larger potential working distance and finer focus point can be reached and the resolution of the sensor can be improved so that the resulting barcode sensor can has wider applications.

Alternatively, the optical layers can be patterned to form the DOEs using direct-write process such as laser or electron beam lithography as is know in the art. Also, the integrated optical circuits can be formed by alternative methods, for example, the substrate could be an optical substrate. The VSCEL and phototransistor and protective layer could then be sequentially disposed on the respective optical substrates and the resulting structures flip chipped so that the optical substrates can then be patterned to form the DOEs.

Following formation of the integrated optical circuits 3, 4, the circuits are embedded in the flat plastic package together with the leadframe 5 which is connected directly to the integrated optical circuits 3, 4 through wire bonding or flip chip bonding.

Figure 7:
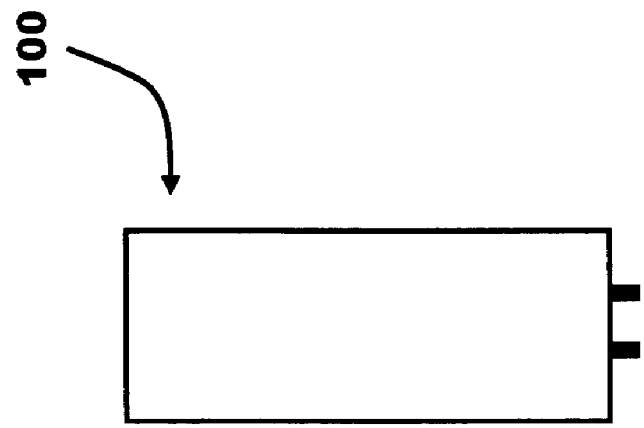
FIGS. 6 & 7 illustrate side views of a bar code sensor according to another embodiment.
Figure 6:
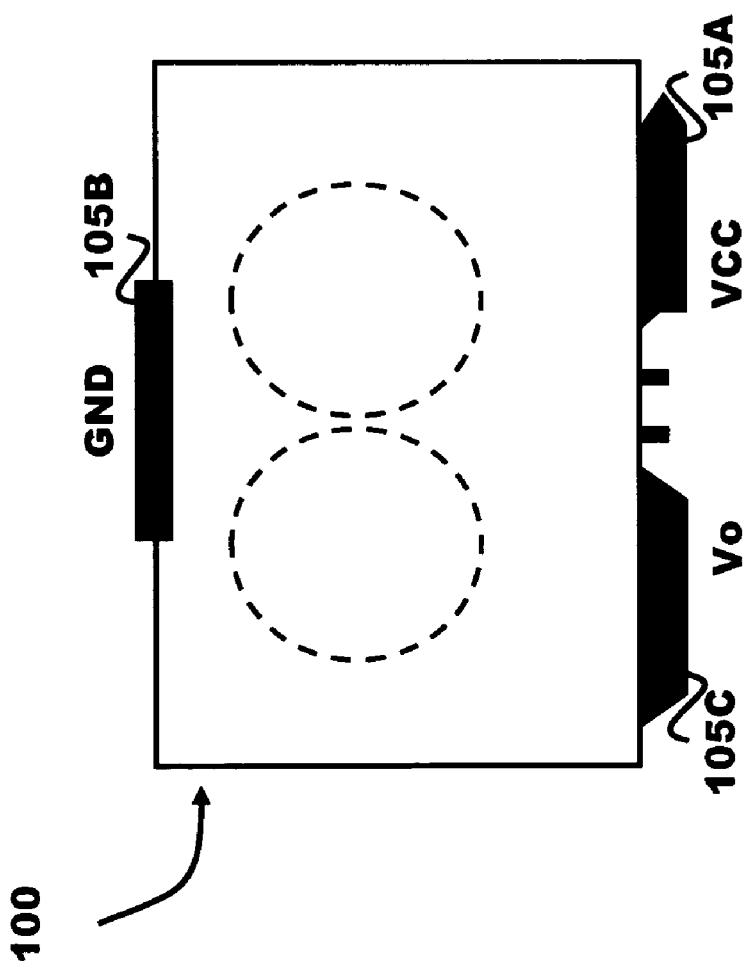

FIGS. 6 & 7 illustrate side views of a surface mount barcode sensor according to another embodiment. The surface mount bar code sensor 100 is identical to the bar code sensor 1 of the first embodiment shown in FIG. 1 with the exception that the pins of the lead frame do not extend from the exterior of the package but rather terminate at respective surface mount pads 105A-C disposed on the exterior wall of the housing 102.

Figure 8A:
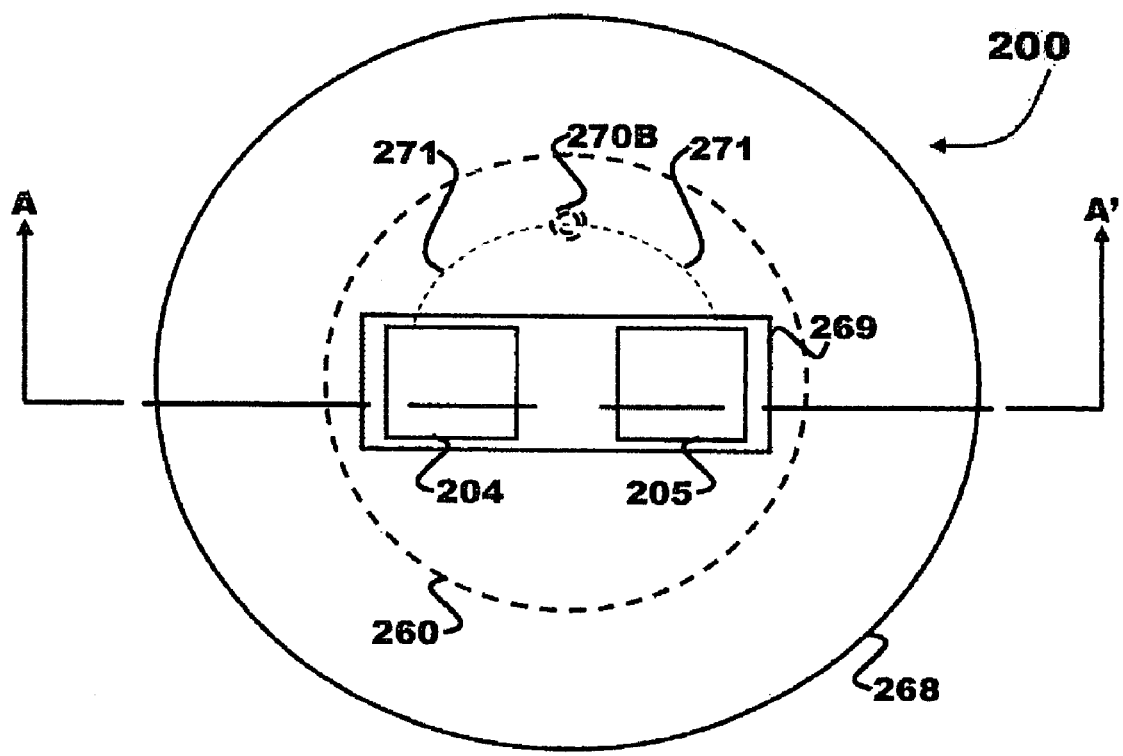
FIG. 8A-8C illustrate top, bottom and cross-sectional side views of a bar code sensor according to yet another embodiment.
Figure 8B:
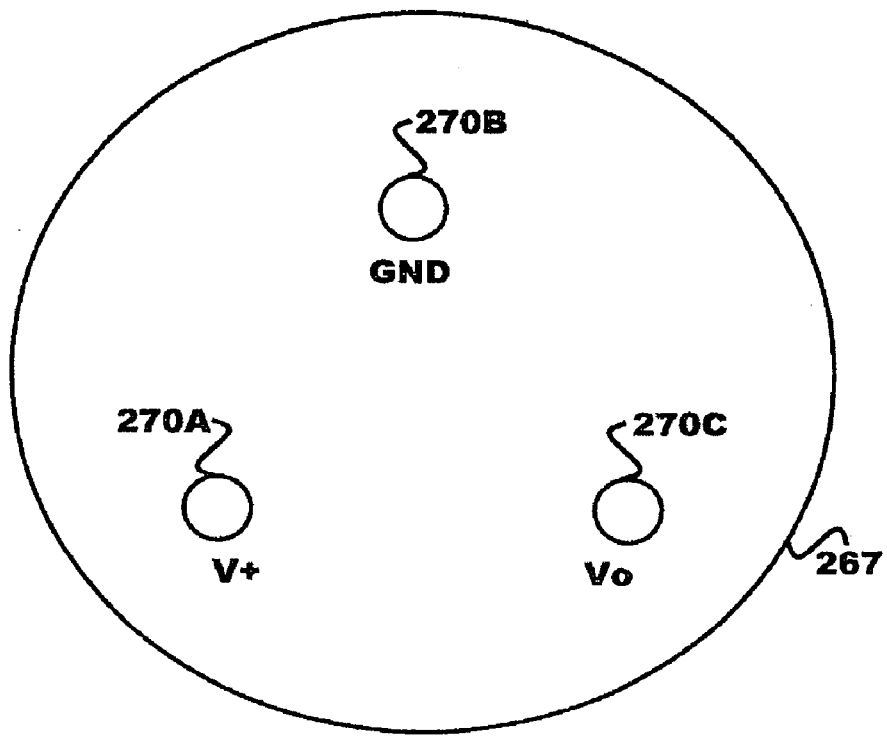
Figure 8C:
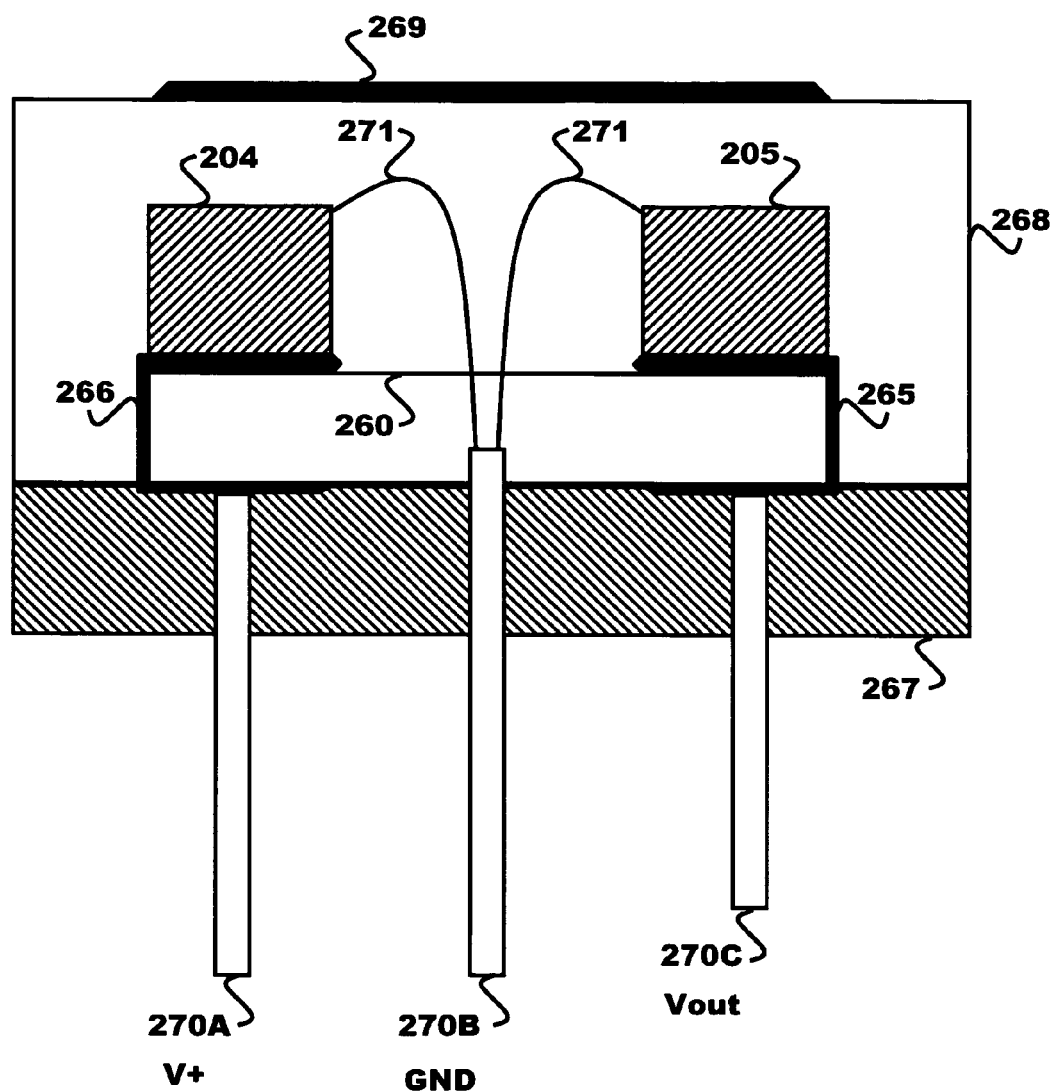

FIGS. 8A & 8C respectively illustrate top and bottom views of a hermetic bar code sensor according to yet another embodiment and FIG. 8C illustrates a side cross-sectional view taken along line A-A' of FIG. 8A. Hermetic bar code scan sensor 200 has optical emitter and detector circuits 204,205 which are similar to optical emitter and detector circuits 3, 4 of the bar code sensor 1 of FIG. 1. However, in this particular embodiment, the optical emitter/detector circuit dies 204,205 including the DOE lenses are disposed at the metal electrodes 265, 266 of the ceramic substrate 260 with DOE lenses facing glass window 269. The ceramic substrate 260 is bonded on the substrate 267, which could be ceramic or resin (Non-conductive materials). Electrodes 266,265 are patterned on the ceramic substrate ends extending between the upper side and underside of the ceramic substrate ends. Vcc pin 270A and Vout pin 270C, which are integrated in substrate 267, are electrically connected with the individual electrodes 265,266 on the underside of the ceramic substrate 260 using a flip-chip bonding method.

Wires 271 bond the common grounds of the emitter/detector circuits 204,205 with a GND pin 270B integrated in the substrate 267 offset from the center of the package. Pins 270A-270C extend between the ceramic substrate 260 underside and the exterior of the substrate 267. A metal can 268 is fixed to the upperside of the substrate 267 enclosing the emitter and detector circuits and other components therein. Glass window 269 seals a single aperture formed in the can upper side thereby protecting the dies from the exterior environment and serving to concentrate light transmitted from the emitter and light reflected from the barcode. The DOE lenses on the dies will perform the optics function without consideration of alignment issue.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

Having thus described the invention what is claimed is:

1. A hermetic barcode sensor package comprising
   an optical emitter circuit having an emitter die for emitting a light beam and a diffraction optical element directly disposed on said emitter die for focusing said light beam;
   a optical detector circuit having a photodetector die for detecting reflective light and another diffraction optical element directly disposed on said photodetector die for guiding said reflective light to said detector;
   a housing having a reading surface and at least one aperture located between said reading surface and both said emitter and photodetector dies;
wherein said optical emitter circuit and said optical detector circuit comprise at least one integrated optical circuit disposed in said housing;
   a ceramic substrate having electrodes disposed thereon; said optical emitter circuit and optical detector circuit being disposed on the upperside of said ceramic substrate in electrical contact with said electrodes; and
   pins in electrical contact with said electrodes.

2. The package of claim 1, wherein said emitter die comprises a vertical cavity surface emitting laser (VCSEL).

3. The package of claim 1, wherein said diffraction optical elements are formed on said emitter die and photodetector die, respectively, by patterning an optical layer, deposited on said emitter and photodectector dies, using photolithography or a direct-write process.

4. The package of claim 3, wherein said housing comprises a non-conductive substrate; and
   a metal can fixed to the upper side of said non-conductive substrate enclosing said at least one optical integrated circuit and said ceramic substrate.

5. The package of claim 4,
   wherein an underside of said ceramic substrate is disposed on said non-conductive substrate; and
   wherein said pins are integrated in said non-conductive substrate and in electrical contact with said electrodes on the underside of said ceramic substrate.

6. The package of claim 5, wherein said aperture is formed in the upperside of said metal can.

7. The package of claim 6, further comprising a window sealing said aperture.

8. The package claim 1, wherein said at least one integrated optical circuit further comprises signal conditioning circuitry electrically connected to said optical detector circuit.

* * * * *